United States Patent
Zheng (10) Patent No.: US 12,354,569 B2
(45) Date of Patent: Jul. 8, 2025

(54) METHOD AND APPARATUS FOR GENERATING COLOR MAPPING CARD

(71) Applicant: Beijing Zitiao Network Technology Co., Ltd., Beijing (CN)

(72) Inventor: Yexin Zheng, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/569,096

(22) PCT Filed: Sep. 7, 2022

(86) PCT No.: PCT/CN2022/117559
§ 371 (c)(1),
(2) Date: Dec. 11, 2023

(87) PCT Pub. No.: WO2023/036183
PCT Pub. Date: Mar. 16, 2023

(65) Prior Publication Data
US 2024/0282280 A1   Aug. 22, 2024

(30) Foreign Application Priority Data
Sep. 10, 2021   (CN) .......................... 202111062469.4

(51) Int. Cl.
G09G 5/10      (2006.01)
G09G 5/02      (2006.01)
H04N 1/60      (2006.01)

(52) U.S. Cl.
CPC ................. G09G 5/02 (2013.01); H04N 1/60 (2013.01)

(58) Field of Classification Search
CPC ................................... G09G 5/02; H04N 1/60
See application file for complete search history.

(56) References Cited

U.S. PATENT DOCUMENTS

| | | | | |
|---|---|---|---|---|
| 2013/0148029 | A1* | 6/2013 | Gish ..................... | G06F 3/1423 348/708 |
| 2017/0237907 | A1* | 8/2017 | Toma ..................... | H04N 23/71 348/229.1 |
| 2017/0366791 | A1* | 12/2017 | Andrivon ............... | H04N 9/642 |
| 2018/0192077 | A1 | 7/2018 | Olivier et al. | |

(Continued)

FOREIGN PATENT DOCUMENTS

| | | |
|---|---|---|
| CN | 104995903 A | 10/2015 |
| CN | 104133884 B | 12/2017 |

(Continued)

*Primary Examiner* — Joe H Cheng
(74) *Attorney, Agent, or Firm* — Astute IP Law Group (57) ABSTRACT

The present disclosure provides a color mapping card generating method, which includes: transferring colors in a first color set into colors in a second color space of a second color display standard, to acquire a second color set, the first color set includes colors in a first color space of a first color display standard; mapping colors in the second color set through an original color mapping card, to acquire a third color set, the original color mapping card is a color mapping card under the second color display standard; transferring colors in the third color set into colors in the first color space, to acquire a fourth color set; and generating a color mapping card under the first color display standard.

20 Claims, 5 Drawing Sheets

Transferring the colors in the first color set to colors in the second color space, to acquire the second color set — S21

Mapping the colors in the second color set through the original color mapping card, to acquire the third color set — S22

Transferring the colors in the third color set into colors in the first color space, to acquire the fourth color set — S23

Generating a color mapping card under the first color display standard, according to the colors in the fourth color set and a corresponding relationship between the colors in the fourth color set and the colors in the first color set — S24

(56) References Cited

U.S. PATENT DOCUMENTS

| | | | | |
|---|---|---|---|---|
| 2018/0241979 A1* | 8/2018 | Kanda | ................... | H04N 5/202 |
| 2020/0394775 A1* | 12/2020 | Andrivon | ............... | H04N 19/70 |
| 2024/0265589 A1* | 8/2024 | Zheng | .................. | G06T 11/001 |
| 2024/0281932 A1* | 8/2024 | Chen | ........................ | G06T 7/90 |

FOREIGN PATENT DOCUMENTS

| | | |
|---|---|---|
| CN | 107852501 A | 3/2018 |
| CN | 107852503 A | 3/2018 |
| CN | 109076231 A | 12/2018 |
| CN | 112102441 A | 12/2020 |
| CN | 112106104 A | 12/2020 |

\* cited by examiner

METHOD AND APPARATUS FOR GENERATING COLOR MAPPING CARD

CROSS REFERENCE TO RELATED APPLICATION

The present application is a national phase of International Patent Application No. PCT/CN2022/117559, filed on Sep. 7, 2022, which claims the priority of Chinese Patent Application No. 202111062469.4, filed on Sep. 10, 2021. All the aforementioned patent applications are hereby incorporated by reference in their entireties.

TECHNICAL FIELD

The present disclosure relates to a field of image processing technology, and more particularly, to a color mapping card generating method and apparatus.

BACKGROUND

Filter processing is an image processing mode of adjusting color components of an input image, and an output image after processing can present a stylized effect. For example, luminance, contrast, saturation, etc. of the input image may be adjusted through filters.

Essence of filter processing is color mapping. That is, a color of the input image undergoes a series of transferring and mapping, and is output as a new color. The commonly used color mapping mode in the related art is: pre-saving a color mapping relationship in a color mapping card; reading colors of pixel points in the input image, when performing color mapping; querying the color mapping card by taking the read colors as index values; and finally, taking the queried colors as colors of corresponding pixel points in the output image. However, color display standards of different images may not be the same; for example, some images have a Standard Dynamic Range (SDR) color display standard, while some images have a High Dynamic Range (HDR) color display standard; and a special effect developer usually only chooses one color display standard for fabrication of a color mapping card. Since color spaces, primary colors, and transfer functions under different color display standards are all different, a color mapping card under one color display standard is only suitable for mapping colors in the color space of the color display standard; if the color mapping card is used to map colors in other color space, output colors will be abnormal. For example, if a color mapping card under the SDR color display standard is used to map colors in a color space of the HDR color display standard, luminance of the output colors will be too low.

In summary, how to use a color mapping card under one color display standard to generate a color mapping card under another color display standard is an urgent problem to be solved.

SUMMARY

In view of this, embodiments of the present disclosure provide a color mapping card generating method and apparatus, for solving the problem of how to use a color mapping card under one color display standard to generate a color mapping card under another color display standard.

To achieve the above objects, embodiments of the present disclosure provide the following technical solutions:

In a first aspect, embodiments of the present disclosure provide a color mapping card generating method. The method includes:
transferring colors in a first color set into colors in a second color space of a second color display standard, to acquire a second color set, wherein the first color set comprises colors in a first color space of a first color display standard;
mapping colors in the second color set through an original color mapping card, to acquire a third color set, wherein the original color mapping card is a color mapping card under the second color display standard;
transferring colors in the third color set into colors in the first color space, to acquire a fourth color set; and
generating a color mapping card under the first color display standard, according to colors in the fourth color set and a corresponding relationship between the colors in the fourth color set and the colors in the first color set.

In a second aspect, embodiments of the present disclosure provide a color mapping card generating apparatus. The apparatus includes:
a first transferring unit, configured to transfer colors in a first color set into colors in a second color space, to acquire a second color set; wherein, the first color set comprises colors in a first color space of a first color display standard;
a mapping unit, configured to map colors in the second color set through an original color mapping card, to acquire a third color set; wherein, the original color mapping card is a color mapping card under a second color display standard;
a second transferring unit, configured to transfer colors in the third color set into colors in the first color space, to acquire a fourth color set; and
a generating unit, configured to generate a color mapping card under the first color display standard, according to colors in the fourth color set and a corresponding relationship between the colors in the fourth color set and the colors in the first color set.

In a third aspect, embodiments of the present disclosure provide an electronic device. The electronic device includes a memory and a processor, wherein, the memory is configured to store computer programs; the processor is configured to cause, when executing the computer programs, the electronic device to implement the color mapping card generating method according to any of the above-described embodiments.

In a fourth aspect, embodiments of the present disclosure provide a computer readable storage medium which has computer programs stored thereon; wherein, the computer programs, when executed by a computing device, cause the computing device to implement the color mapping card generating method according to any of the above-described embodiments.

In a fifth aspect, embodiments of the present disclosure provide a computer program product, wherein, the computer program product, when running on a computer, causes the computer to implement the color mapping card generating method according to any of the above-described embodiments.

BRIEF DESCRIPTION OF THE DRAWINGS

The accompanying drawings herein are incorporated into the specification and form a part of this specification, illustrating embodiments in accordance with the present disclosure, and are used together with the specification to explain the principles of the disclosed embodiments.

To provide a clearer explanation of the disclosed embodiments or technical solutions in the related art, a brief introduction will be given to the accompanying drawings required in the embodiments or description of the related art. It is obvious that for ordinary technical personnel in the art, other accompanying drawings can be obtained based on these drawings without any creative effort.

DETAILED DESCRIPTION

To have a clearer understanding of the above objectives, features, and advantages of the disclosed embodiments, the following will further describe the scheme of the disclosed embodiments. It should be noted that in the absence of conflict, the embodiments disclosed herein and the features in the embodiments can be combined with each other.

Specific details are elaborated in the following description to facilitate a full understanding of the disclosed embodiments, but the disclosed embodiments can also be implemented in other ways different from those described here. Obviously, the embodiments in the specification are only a portion of the embodiments of the present disclosure, rather than all of them.

In the embodiments of the present disclosure, words such as "exemplary" or "for example" are used as examples, illustrations, or explanations. Any embodiments or designs described as "exemplary" or "for example" in the present disclosure should not be construed as being more preferred or advantageous than other embodiments or designs. Specifically, the use of words such as "exemplary" or "for example" aims to present relevant concepts in a specific way. In addition, in the description of the present disclosure, unless otherwise specified, the meaning of "multiple" refers to two or more.

An executing body of the color mapping card generating method provided by the embodiment of the present disclosure may be a color mapping card generating apparatus. The color mapping card generating apparatus may be a mobile phone, a tablet personal computer, a laptop, a palmtop computer, a vehicle-mounted terminal, a wearable device, an Ultra-Mobile Personal Computer (UMPC), a netbook or a Personal Digital Assistant (PDA), a Personal Computer (PC), etc. which will not be specifically limited in the present disclosure.

Figure 1:
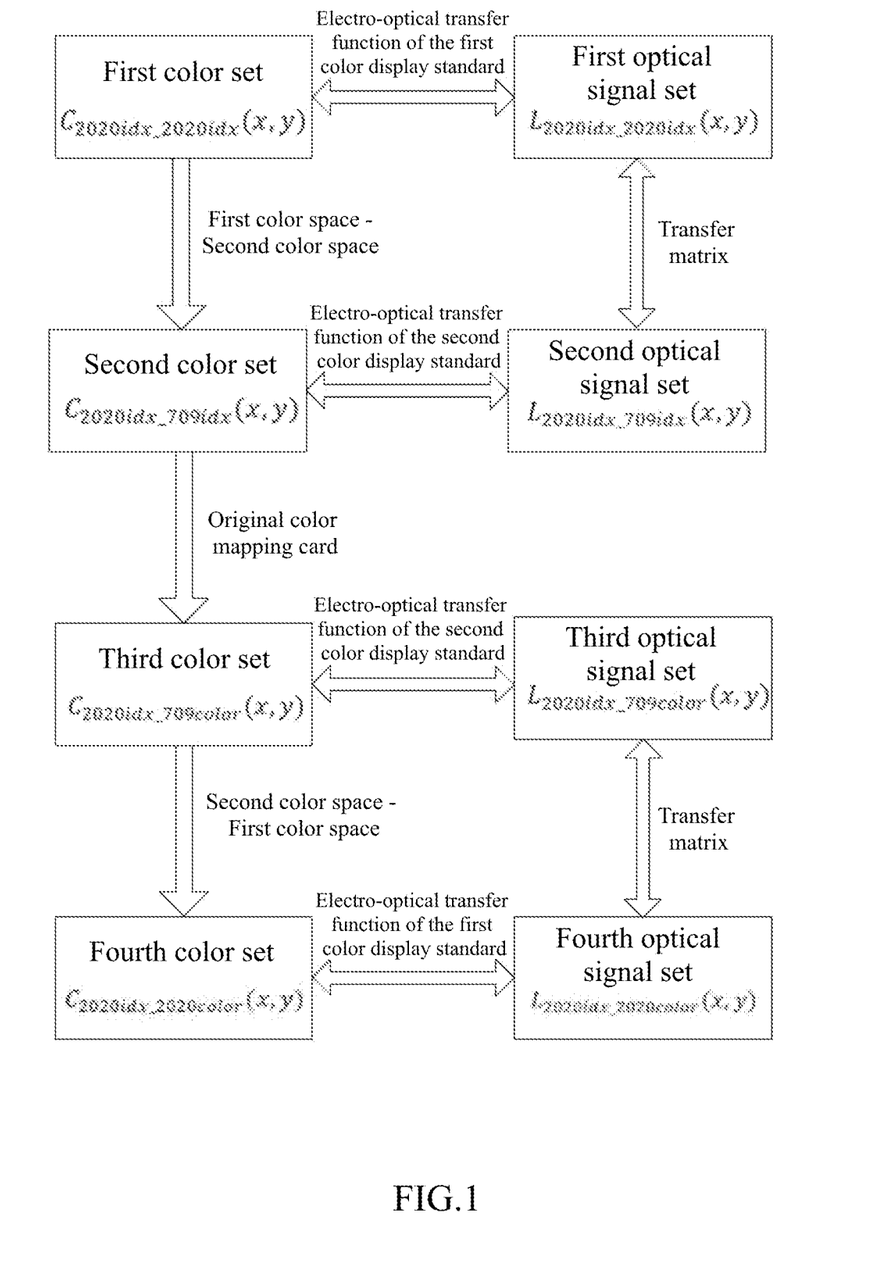
FIG. 1 is a schematic diagram of set transfer relationships provided by embodiments of the present disclosure.

Hereinafter, defined terms and transfer relationships between sets according to the embodiments of the present disclosure will be illustrated firstly, with reference to the schematic diagram of the set transfer relationships shown in FIG. 1:

First color set: a color set composed of all colors in a first color space of a first color display standard. Hereinafter, the embodiments of the present disclosure will be illustrated by taking the first color display standard as a High Dynamic Range (HDR) color display standard; since a color space of the HDR color display standard is bt.2020, hereinafter, colors in the first color set are represented by $C_{2020idx\_2020idx}(x,y)$.

Second color set: a color set obtained by transferring the colors in the first color set from the first color space to a color space of a second color display standard. Hereinafter, the embodiments of the present disclosure will be illustrated by taking the second color display standard as a Standard Dynamic Range (SDR) color display standard; since a color space of the SDR color display standard is bt.709, hereinafter, colors in the second color set are represented by $C_{2020idx\_709idx}(x,y)$.

Original color mapping card: a color card that supports taking colors in the second color space as an input, and mapping input colors as other colors in the second color space.

Third color set: a color set obtained by mapping the colors in the second color set through the original color mapping card; hereinafter, colors in the third color set are represented by $C_{2020idx\_709color}(x,y)$.

Fourth color set: a color set obtained by transferring the colors in the third color set from the second color space to the first color space; hereinafter, colors in the fourth color set are represented by $C_{2020idx\_2020color}(x,y)$.

First optical signal set: an optical signal set obtained by transferring the colors in the first color set into optical signals, based on an electro-optical transfer function of the first color display standard; hereinafter, optical signals in the first optical signal set are represented by $L_{2020idx\_2020idx}(x,y)$.

Second optical signal set: an optical signal set obtained by transferring the colors in the second color set into optical signals, based on an electro-optical transfer function of the second color display standard; hereinafter, optical signals in the second optical signal set are represented by $L_{2020idx\_709idx}(x,y)$.

Third optical signal set: an optical signal set obtained by transferring the colors in the third color set into optical signals, based on an electro-optical transfer function of the third color display standard; hereinafter, optical signals in the third optical signal set are represented by $L_{2020idx\_709color}(x,y)$.

Fourth optical signal set: an optical signal set obtained by transferring the colors in a seventh color set into optical signals, based on the electro-optical transfer function of the first color display standard; hereinafter, optical signals in the fourth optical signal set are represented by $L_{2020idx\_2020color}(x,y)$.

First color space: a color space of the first color display standard. When the first color display standard is the High Dynamic Range HDR color display standard, the first color space is bt.2020.

Second color space: a color space of the second color display standard. When the first color display standard is the SDR color display standard, the second color space is bt.709.

Figure 2:
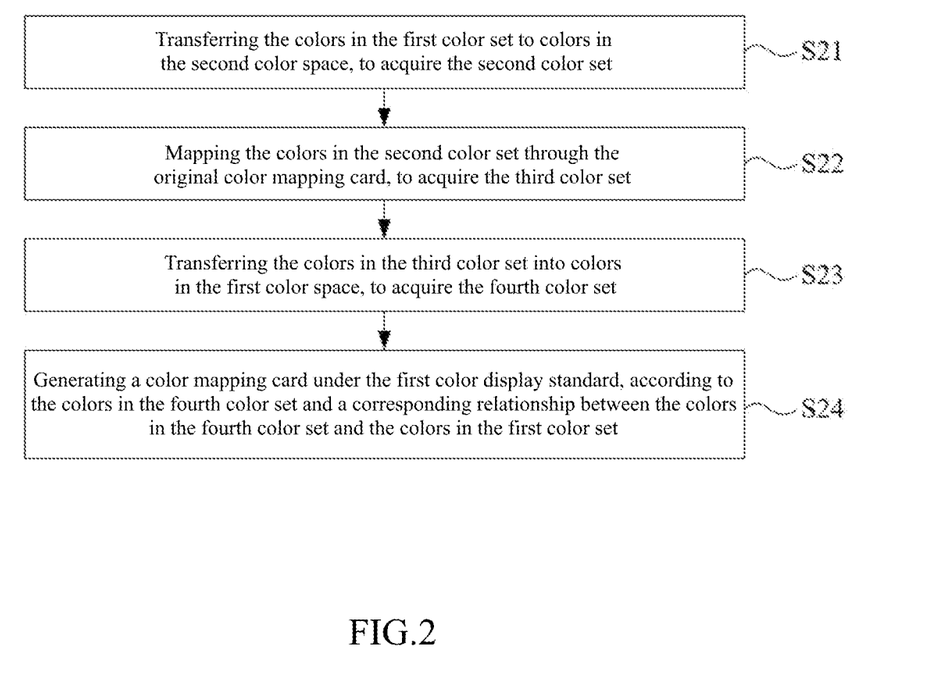
FIG. 2 is a flow chart I of steps of a color mapping card generating method provided by embodiments of the present disclosure.

Based on the above-described content, the embodiments of the present disclosure provide a color mapping card generating method; referring to FIG. 2, the color mapping card generating method includes step S21 to step S24 as follows:

S21: transferring the colors in the first color set to colors in the second color space, to acquire the second color set.

The first color set includes the colors in the first color space of the first color display standard.

The first color display standard according to the embodiment of the present disclosure refers to a color display standard to have a color mapping card thereof generated based on a color mapping card of other color display standard; while the second color display standard refers to a color display standard to have a color mapping card of other color display standard generated based on a color mapping card thereof. The first color display standard and the second color display standard may be any two color display standards. The first color display standard and the second color display standard will not be limited in the embodiments of the present disclosure.

Exemplarily, the first color display standard may be a High Dynamic Range (HDR) color display standard; and the second color display standard may be a Standard Dynamic Range (SDR) color display standard. Hereinafter, it will be illustrated by taking the first color display standard specifically as a Hybrid Log Gamma (HLG) color display standard in the HDR color display standard.

Specifically, the HLG color display standard is a kind of High Dynamic Range (HDR) color display standard, with a color space of bt.2020, three primary colors of bt.2020, and an opto-electrical transfer function following the ARIB-STD-b67 standard. As compared with the HDR color display standard, the SDR color display standard has smaller maximum luminance allowed for display, with a color space of bt.709, three primary colors of bt.709, and an opto-electrical transfer function following the ITU-RBT.1886 standard.

S22: mapping the colors in the second color set through the original color mapping card, to acquire the third color set.

The original color mapping card is a color mapping card under the second color display standard.

Specifically, the original color mapping card may be a color mapping card fabricated by a special effect editor by using a special effect fabrication tool of the second color display standard. Since the original color mapping card is a color mapping card under the second color display standard, the original color mapping card may accept a color from the second color space as an input and map the input color as another color in the second color space. The colors in the second color set are all colors in the second color space, so the colors in the second color set may be respectively taken as inputs to the original color mapping card, and colors obtained by mapping the colors in the second color set may be combined into the third color set. It should be noted that the colors in the third color set are still the colors in the second color space.

S23: transferring the colors in the third color set into colors in the first color space, to acquire the fourth color set.

As described above, the colors in the third color set are colors in the second color space, so, the transferring the colors in the third color set to the colors in the first color space is: transferring the colors in the third color set back into the first color space. For example, if the first color display standard is the HLG color display standard, and the second color display standard is the SDR color display standard, then step S21 is transferring the colors in color space bt.2020 to colors in color space bt.709, and step S23 is transferring the colors in color space bt.709 back into color space bt.2020.

S24: generating a color mapping card under the first color display standard, according to the colors in the fourth color set and a corresponding relationship between the colors in the fourth color set and the colors in the first color set.

Specifically, the corresponding relationship between colors in different color sets according to the embodiment of the present disclosure refers to that: if a color in one color set is obtained based on another color in another color set, then there is a corresponding relationship between the two colors. For example, if a color $C_{2020idx\_2020idx}(x_1,y_1)$ in the first color set is transferred into a color $C_{2020idx\_709idx}(x_1,y_1)$ in the second color set, $C_{2020idx\_709idx}(x_1,y_1)$ is further mapped as a color $C_{2020idx\_709color}(x_1,y_1)$ in the third color set, and the $C_{2020idx\_2020idx}(x_1,y_1)$ is further transferred into a color $C_{2020idx\_2020color}(x_1,y_1)$ in the fourth color set, then there is a corresponding relationship between any two of $C_{2020idx\_2020idx}(x_1,y_1)$, $C_{2020idx\_709idx}(x_1,y_1)$, $C_{2020idx\_709color}(x_1, y_1)$, and $C_{2020idx\_2020color}(x_1,y_1)$.

Through the above-described step S21 to step S24, in the embodiments of the present disclosure, a mapped color in the corresponding first color display standard is obtained according to any color in the first color display standard; so, the color mapping card under the first color display standard may be generated according to the colors in the first color display standard before mapping (the colors in the first set) and the colors in the first color display standard after mapping (the colors in the fourth set).

The color mapping card generating method provided by the embodiments of the present disclosure includes: transferring the colors in the first color set composed of the colors in the first color space of the first color display standard into the colors in the second color space, to acquire the second color set; mapping the colors in the second color set through the original color mapping card under the second color display standard to acquire the third color set; transferring the colors in the third color set into the colors in the first color space, to acquire the fourth color set; and generating the color mapping card under the first color display standard according to the colors in the fourth color set and the corresponding relationship between the colors in the fourth color set and the colors in the first color set. In the color mapping card generating method provided by the embodiment of the present disclosure, the colors in the first color set may be firstly transferred into the colors in the second color space; then the colors in the first color space after transferring are mapped through the color mapping card under the second color display standard; then the colors obtained through mapping are transferred back into the colors of the first color display standard; and finally, the color mapping card under the first color display standard is generated according to the corresponding relationship between the colors in the first color space after mapping and the colors in the first color space before mapping. Therefore, the embodiment of the present disclosure provides an implementation of generating the color mapping card under the first color display standard through the color mapping card under the second color display standard, which solves the problem of how to use a color mapping card under one color display standard to generate a color mapping card under another color display standard.

Figure 3:
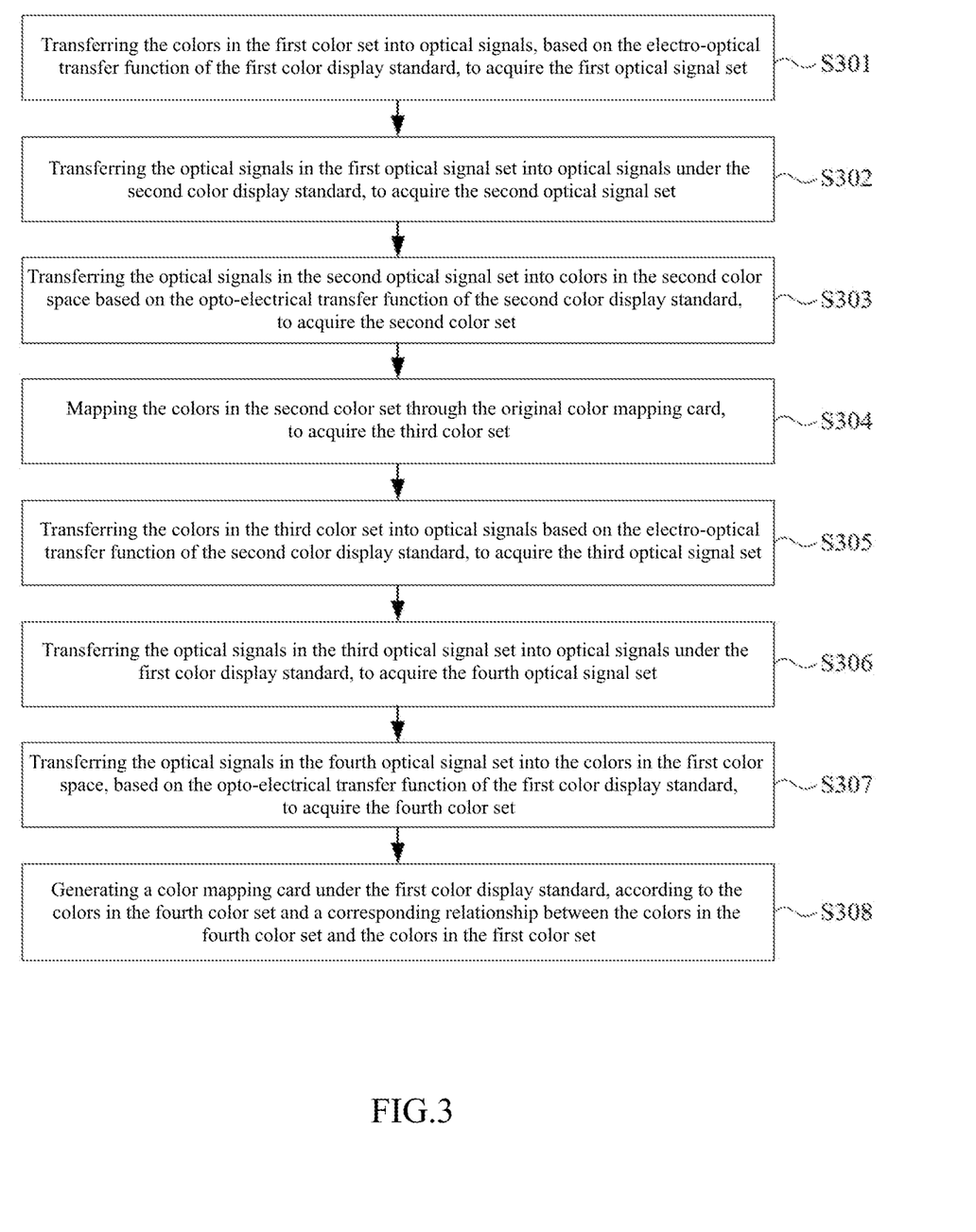
FIG. 3 is a flow chart II of steps of the color mapping card generating method provided by embodiments of the present disclosure.
Figure 4:
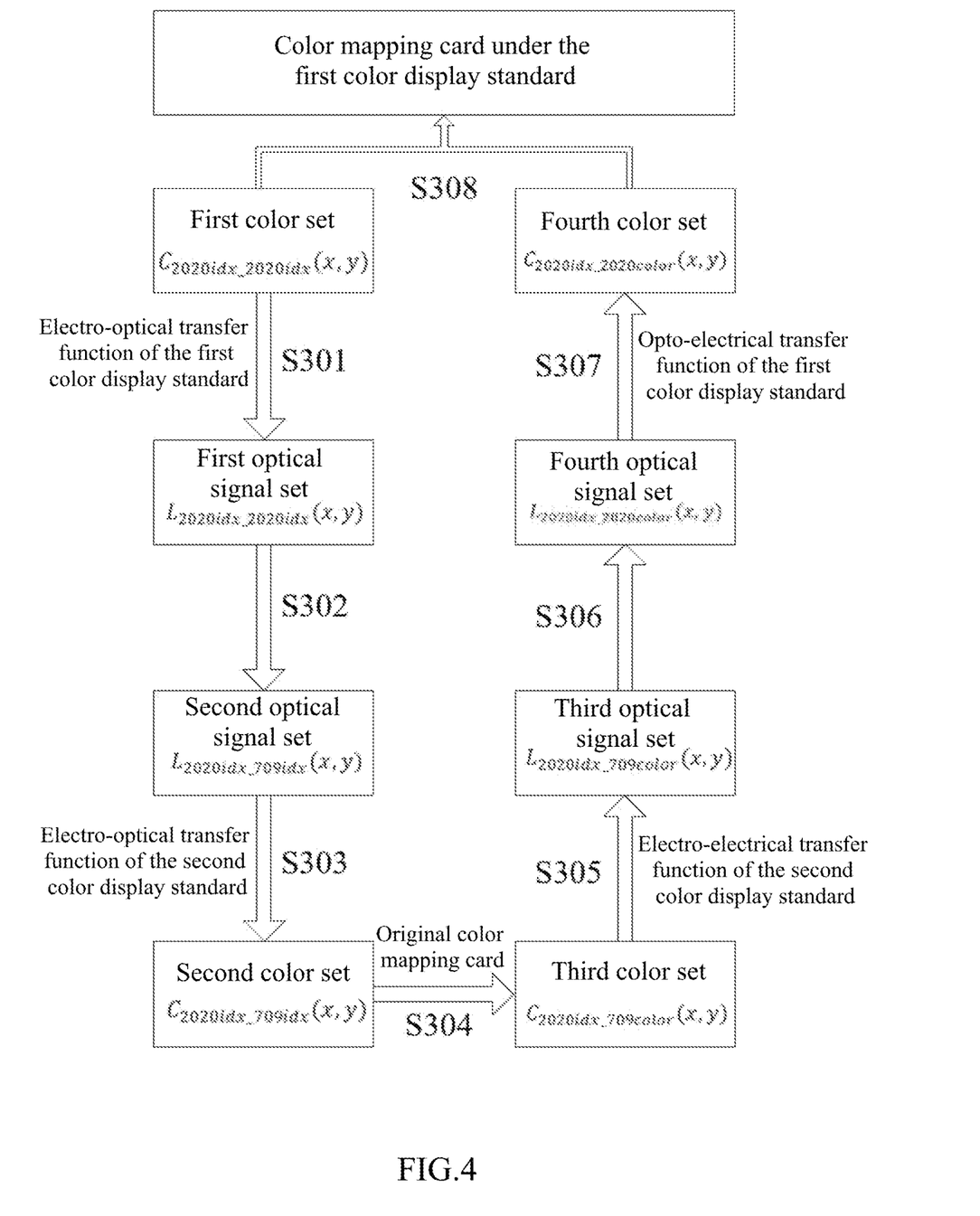
FIG. 4 is a schematic diagram of a data stream of the color mapping card generating method provided by embodiments of the present disclosure.

As extension and refinement of the above-described embodiments, embodiments of the present disclosure further provide another color mapping card generating method, referring to the flow chart of steps shown in FIG. 3 and the schematic diagram of a data stream shown in FIG. 4, the color mapping card generating method includes:

S301: transferring the colors in the first color set into optical signals, based on the electro-optical transfer function of the first color display standard, to acquire the first optical signal set.

The first color set includes the colors in the first color space of the first color display standard.

Specifically, the electro-optical transfer function according to the embodiment of the present disclosure refers to a function used to describe a relationship between nonlinear color values (digitally encoded pixel values, electrical signals) input to a display and linear color values (optical signals) displayed on the display.

Since it is an electrical signal (color value) that is stored and transmitted by a device, and electro-optical transfer functions of different color display standards are not the same, it is necessary to firstly transfer the colors (the electrical signals) in the first color set into optical signals in the first color display standard, when transferring the colors in the first color space to the colors in the second color space, so as to implement color value transfer in different color spaces in a linear space.

Exemplarily, the above-described step S301 will be illustrated below by taking the first color display standard as the HLG color display standard.

An opto-electrical transfer function of the HLG color display standard is:

$$V = \begin{cases} \sqrt{3} * L_c^{0.5} & \frac{1}{12} \geq L_c \geq 0 \\ a * \ln(12L_c - b) + c & 1 \geq L_c > \frac{1}{12} \end{cases}$$

Where, V is an electrical signal under the HLG color display standard; $L_c$ is an optical signal under the HLG color display standard; a, b, c are all constants, a=0.17883277, b=1-4a=0.28466892, and c=0.5-aln(4a)=0.55991073.

By seeking an inverse function of the electro-optical transfer function of the HLG color display standard, an electro-optical transfer function of the HLG color display standard may be obtained as:

$$L_c = \begin{cases} \frac{V^2}{\sqrt{3}} & 0 \leq V \leq 0.5 \\ \frac{1}{12}\left[\exp\left(\frac{V-c}{a}\right) + b\right] & 0.5 \leq V \end{cases}$$

A red component $R_{2020idx\_2020idx}(x,y)$, a green component $G_{2020idx\_2020idx}(x,y)$, and a blue component $B_{2020idx\_2020idx}(x,y)$ of the colors $C_{2020idx\_2020idx}(x,y)$ in the first color set (a set composed of colors in the color space bt.2020 of the HLG color display standard) are respectively taken as electrical signals V for substitution into the above-described electro-optical transfer function, so that the colors in the first color set may be transferred into optical signals under the HLG color display standard, so as to acquire the first optical signal set.

S302: transferring the optical signals in the first optical signal set into optical signals under the second color display standard, to acquire the second optical signal set.

Specifically, the optical signals in the first optical signal set are optical signals under the first color display standard. Therefore, the above-described step S302 is transferring the optical signals under the first color display standard into optical signals under the second color display standard. There are specific transfer matrices between optical signals under different color display standards. By using a corresponding transfer matrix, the optical signals under the first color display standard may be transferred into the optical signals under the second color display standard.

For example, when the first color display standard is the HLG color display standard and the second color display standard is the SDR color display standard, the optical signals under the HLG color display standard are represented as $L_{2020idx\_2020idx}(x,y)$; $L_{2020idx\_2020idx}(x,y)$ is transferred to obtain the optical signals under the SDR color display standard, which are represented as $L_{2020idx\_709idx}(x,y)$, then there is:

$$L_{2020idx709idx}(x, y) = \begin{vmatrix} 1.6605 & -0.5876 & -0.0728 \\ -0.1246 & 1.1329 & -0.0083 \\ -0.0182 & -0.1006 & 1.1187 \end{vmatrix} \times L_{2020idx2020idx}(x, y).$$

Therefore, by substituting the optical signals in the first optical signal set into the above-described equation, the corresponding optical signals under the second color display standard may be acquired, to further acquire the second optical signal set.

S303: transferring the optical signals in the second optical signal set into colors in the second color space based on the opto-electrical transfer function of the second color display standard, to acquire the second color set.

The opto-electrical transfer function according to the embodiments of the present disclosure refers to a function used to describe a relationship between linear color values (optical signals) and nonlinear color values (digitally encoded pixel values, electrical signals). The color display standards each have a fixed opto-electrical transfer function; when the color display standard to which the optical signal that needs to undergo opto-electric transfer belongs is determined, the optical signal may be transferred into an electrical signal through the opto-electrical transfer function of the corresponding color display standard. In the embodiment of the present disclosure, the optical signals in the second optical signal set are optical signals under the second color display standard; so, the optical signals in the second optical signal set may be transferred into the colors in the second color space through the opto-electrical transfer function of the second color display standard.

Following the above example, the second color display standard is the SDR color display standard, and an opto-electrical transfer function of the SDR color display standard is:

$$V = \frac{1}{a}\left[\max(L_c, 0)^{\frac{1}{\gamma}}\right] - b$$

$$a = \left(L_\omega^{\frac{1}{\gamma}} - L_b^{\frac{1}{\gamma}}\right)^\gamma$$

$$b = \frac{L_b^{\frac{1}{\gamma}}}{L_\omega^{\frac{1}{\gamma}} - L_b^{\frac{1}{\gamma}}}$$

Where, V is an electrical signal under the second color display standard, $L_c$ is an optical signal under the second color display standard, $L_\omega$ is an optical signal corresponding to a maximum value of the electrical signal, $L_b$ is an optical signal corresponding to a minimum value of the electrical signal, and $\gamma$ is a constant.

Therefore, a red optical signal component $LR_{2020idx\_709idx}(x,y)$, a green optical signal component $LG_{2020idx\_709idx}(x,y)$, and a blue optical signal component $LB_{2020idx\_709idx}(x,y)$ of the optical signals $L_{2020idx\_709idx}(x,y)$ in the second optical signal set are taken as $L_c$ for substitution into the above-described opto-electrical transfer function, to obtain a red component $R_{2020idx\_709idx}(x,y)$, a green component $G_{2020idx\_709idx}(x,y)$, and a blue component $B_{2020idx\_709idx}(x,y)$ of the colors $C_{2020idx\_709idx}(x,y)$ in the second color set, and further acquire the second color set.

Optionally, the optical signal $L_\omega$ corresponding to the maximum value of the electrical signal, and the optical signal $L_b$ corresponding to the minimum value of the electrical signal may be normalized. That is, let $L_b=0$, $L_\omega=1$, and optical signals corresponding to other electrical signals are located between 0 and 1 in a floating point form.

So far, through the above-described step S301 to step S303, the embodiment of the present disclosure implements transferring the colors in the first color set to the colors in the second color space, to acquire the second color set.

S304: mapping the colors in the second color set through the original color mapping card, to acquire the third color set.

The original color mapping card is the color mapping card under the second color display standard.

As an optional implementation of the present disclosure, the original color mapping card includes a color block corresponding to each color in the second color space. That is, the colors in the second color space are in one-to-one correspondence with the color blocks in the original color mapping card, and each color in the second color space may be uniquely mapped as another color in the color space through the original color mapping card.

When the colors in the second color space are in one-to-one correspondence with the color blocks in the original color mapping card, the above-described step S304 (mapping the colors in the second color set through the original color mapping card, to acquire the third color set) includes:

Looking up the corresponding color blocks in the original color mapping card by taking the colors in the second color set as an index, to obtain mapped colors of the colors in the second color set, and then combining the mapped colors of the colors in the second color set into the third color set.

As an optional implementation of the present disclosure, the original color mapping card includes a plurality of mapped color groups; first color components of the plurality of mapped color groups are respectively a plurality of sampled values of the first color components in the second color space. The above-described step S304 (mapping the colors in the second color set through the original color mapping card, to acquire the third color set) includes step a to step e as follows:

Step a: acquiring a first mapped color group and a second mapped color group corresponding to the colors, according to the first color components of the colors in the second color set.

Wherein, a first mapped color group and a second mapped color group corresponding to any color in the second color set are respectively mapped color groups whose first color components are adjacent to the first color component of the color.

The first color component of the mapped color group in the original color mapping card according to the embodiment of the present disclosure refers to that: if colors whose first color components are the same in the second color space are divided into one color group, and mapped colors of all colors in the one color group are taken as one mapped color group, then a first color component of the colors in the color group mapped by the one mapped color group is just the first color component of the mapped color group. For example, if all colors whose first color components are m in the second color space are taken as one color group, and mapped colors of colors in the color group are taken as one mapped color group, then a first color component of the mapped color group is m.

For example, a plurality of sampled values of the first color component are respectively: 0, 1/63, 2/63, 3/63, 4/63, . . . 62/63, 1; if a first color component of a certain color in the second color set is 18/255, then the first color component of the color is located between the sampled value 4/63 and the sampled value 5/63 (mapped colors adjacent to the first color component of the color include mapped color groups whose first color components are respectively 4/63 and 5/63), so, it is determined that the mapped color group whose first color component is 4/63 and the mapped color group whose first color component is 5/63 are respectively a first mapped color group and a second mapped color group corresponding to the color.

Further, when the first color component is a blue component, the original color mapping card includes 8*8 mapped color groups, and from left to right and from top to bottom, blue components of the mapped color groups are sequentially 0, 1/63, 2/63, 3/63, . . . , 62/63, 1; start coordinates of a first mapped color group corresponding to color $C_{(R,G,B)}$ in the first color set_are $(x_{floor}, y_{floor})$, start coordinates of a second mapped color group corresponding to color $C_{2020idx\_2020idx}(x,y)$ in the first color set are $(x_{ceil}, y_{ceil})$, then there are:

$$y_{floor} = \left\lfloor \frac{B \times 63}{8} \right\rfloor;$$

$$x_{floor} = \lfloor B \times 63 \rfloor - y_{floor} \times 8;$$

$$y_{ceil} = \left\lfloor \frac{\lceil B \times 63 \rceil}{8} \right\rfloor;$$

$$x_{ceil} = \lceil B \times 63 \rceil - y_{floor} \times 8.$$

Step b: acquiring first coordinate values and second coordinate values corresponding to the colors respectively in the first mapped color group and the second mapped color group, according to second color components and third color components of the colors in the second color set.

Exemplarily, when the second color component is a red component and the third color component is a green component, the original color mapping card includes 8*8 mapped color groups, 512*512 color blocks; from left to right and from top to bottom, blue components of the mapped color groups are respectively 0, 1/63, 2/63, 3/63, . . . , 62/63, 1; red components of colors of the mapped color groups along the x axis increase from 0 to 1; red components of colors in the mapped color groups along the y axis increase from 0 to 1; start coordinates of the first mapped color group corresponding to color $C_{2020idx\_709idx}(x,y)$ in the second color set are $(x_{floor}, y_{floor})$, start coordinates of the second mapped color group corresponding to color $C_{2020idx\_709idx}(x,y)$ in the second color set_are $(x_{ceil}, y_{ceil})$, sampling coordinates (corresponding to the first coordinate values) of color $C_{2020idx\_709idx}(x,y)$ in the second color set_in the first mapped color group are $(pos_{x_{floor}},$ $pos_{y_{floor}}$), and sampling coordinates (corresponding to the second coordinate values) of color $C_{2020idx\_709idx}(x,y)$ in the second color set_in the first mapped color group are ($pos_{x_{ceil}}$, $pos_{y_{ceil}}$), then there are:

$$pos_{x_{floor}} = \frac{x_{floor}}{8} + \frac{0.5}{512} + \left(\frac{1}{8} - \frac{1}{512}\right) \times R_{2020idx\_709idx}(x, y)$$

$$pos_{y_{floor}} = \frac{y_{floor}}{8} + \frac{0.5}{512} + \left(\frac{1}{8} - \frac{1}{512}\right) \times G_{2020idx\_709idx}(x, y)$$

$$pos_{x_{ceil}} = \frac{x_{ceil}}{8} + \frac{0.5}{512} + \left(\frac{1}{8} - \frac{1}{512}\right) \times R_{2020idx\_709idx}(x, y)$$

$$pos_{y_{ceil}} = \frac{y_{ceil}}{8} + \frac{0.5}{512} + \left(\frac{1}{8} - \frac{1}{512}\right) \times G_{2020idx\_709idx}(x, y)$$

Step c: reading first mapped colors and second mapped colors of the colors from the original color mapping card, respectively according to the first coordinate values and the second coordinate values corresponding to the colors in the second color set.

That is, the colors in positions of the first coordinate values corresponding to the colors in the original color mapping card (the first mapped color group) are read as the first mapped colors of the colors, and the colors in positions of the second coordinate values corresponding to the colors in the original color mapping card (the second mapped color group) are read as the second mapped colors of the colors.

Step d: acquiring mapped colors of the colors in the second color set, according to the first mapped colors and the second mapped colors of the colors in the second color set.

As an optional implementation of the embodiment of the present disclosure, the above-described step d (acquiring mapped colors of the colors in the second color set, according to the first mapped colors and the second mapped colors of the colors in the second color set) includes step 1 to step 2 as follows:

Step 1: acquiring weighting coefficients of the colors in the first color set, according to the first color components of the colors in the second color set.

For example, when the first color component is a blue component, the original color mapping card includes 8*8 mapped color groups, and from left to right and from top to bottom, blue components of the mapped color groups are sequentially 0, 1/63, 2/63, 3/63, . . . , 62/63, 1; then the acquiring the weighting coefficients of the colors in the second color set according to the blue components of the colors in the second color set may include acquiring the weighting coefficients of the colors according to a formula as follows:

$$S = B_{2020idx\_709idx}(x, y) \times 63 - \lfloor B_{2020idx\_709idx}(x, y) \times 63 \rfloor$$

Where, $B_{2020idx\_709idx}(x,y)$ is a blue component of color $C_{2020idx\_709idx}(x,y)$ in the second color set, and S is a weighting coefficient of color $C_{2020idx\_709idx}(x,y)$ in the second color set.

Step 2: weighting the first mapped colors and the second mapped colors of the colors in the second color set according to the weighting coefficients, to acquire the mapped colors of the colors in the second color set.

Suppose: color $C_{2020idx\_709idx}(x,y)$ in the second color set has a first mapped color of $C(pos_{x_{floor}}, pos_{y_{floor}})$, a second mapped color of $C(pos_{x_{ceil}}, pos_{y_{ceil}})$, a mapped color of $C_{2020idx\_709color}(x,y)$, and a weighting coefficient of S, then there is:

$$C_{2020idx\_709color}(x, y) = C(pos_{x_{floor}}, pos_{y_{floor}}) \times (1 - S) + C(pos_{x_{ceil}}, pos_{y_{ceil}}) \times S$$

Step e: generating the third color set according to the mapped colors of the colors in the second color set.

When the first color components of the mapped color group are respectively a plurality of sampled values of the first color components of the colors under the second color display standard, in some cases the first color components of the colors in the first color set will be located between two sampled values; if a mapped color group corresponding to one of the sampled values is directly selected for color mapping, then a significant error will be brought. In the above-described embodiment, the first mapped color group and the second mapped color group whose first color components are adjacent to the colors are acquired; the first coordinate values and the second coordinate values corresponding to the colors are acquired respectively in the first mapped color group and the second mapped color group, according to the second color components and the third color components; then the first mapped colors and the second mapped colors of the colors are read in the original color mapping card, respectively according to the first coordinate values and the second coordinate values corresponding to the colors in the first color set; and finally the mapped colors of the colors are acquired according to the first mapped colors and the second mapped colors of the colors. Since in the above-described embodiments, mapped colors may be acquired respectively in two adjacent mapped color groups, and a final mapped color may be jointly acquired according to the mapped colors acquired from the two mapped color groups, the above-described embodiments may reduce errors in color mapping and improve accuracy of generating the color mapping card.

So far, through the above-described step S301 to step S304, the embodiments of the present disclosure implements mapping the colors in the first color set as corresponding mapped colors in the second color space through the original color mapping card under the second color display standard.

S305: transferring the colors in the third color set into optical signals based on the electro-optical transfer function of the second color display standard, to acquire the third optical signal set.

Following the above example, the second color display standard is the SDR color display standard, and an opto-electrical transfer function of the SDR color display standard is:

$$V = \frac{1}{a}\left[\max(L_c, 0)^{\frac{1}{\gamma}}\right] - b$$

$$a = \left(L_\omega^{\frac{1}{\gamma}} - L_b^{\frac{1}{\gamma}}\right)^\gamma$$

$$b = \frac{L_b^{\frac{1}{\gamma}}}{L_\omega^{\frac{1}{\gamma}} - L_b^{\frac{1}{\gamma}}}$$

By seeking an inverse function of the opto-electrical transfer function of the SDR color display standard, an electro-optical transfer function of the SDR color display standard may be obtained as:

$$L_c = a\{\max[(V+b), 0]\}^\gamma$$

$$a = \left(L_\omega^{\frac{1}{\gamma}} - L_b^{\frac{1}{\gamma}}\right)^\gamma$$

$$b = \frac{L_b^{\frac{1}{\gamma}}}{L_\omega^{\frac{1}{\gamma}} - L_b^{\frac{1}{\gamma}}}$$

Therefore, a red optical signal component $R_{2020idx\_709color}(x,y)$, a green optical signal component $G_{2020idx\_709color}(x,y)$, and a blue optical signal component $B_{2020idx\_709color}(x,y)$ of the colors $C_{2020idx\_709color}(x,y)$ in the third color set are taken as $L_c$ for substitution into the above-described electro-optical transfer function, to obtain a red component $LR_{2020idx\_709color}(x,y)$, a green component $LG_{2020idx\_709color}(x,y)$, and a blue component $LB_{2020idx\_709color}(x,y)$ of the optical signals $L_{2020idx\_709color}(x,y)$ in the third optical signal set, and further acquire the third optical signal set.

S306: transferring the optical signals in the third optical signal set into optical signals under the first color display standard, to acquire the fourth optical signal set.

Specifically, the optical signals in the third optical signal set are the optical signals under the second color display standard; so, the above-described step S306 is transferring the optical signals under the second color display standard into optical signals under the first color display standard.

Exemplarily, when the first color display standard is the HLG color display standard and the second color display standard is the SDR color display standard, the optical signal under the HLG color display standard is represented as $L_{2020idx\_2020idx}(x,y)$, $L_{2020idx\_2020idx}(x,y)$ is transferred to obtain an optical signal under the SDR color display standard, which is represented as $L_{2020idx\_709idx}(x,y)$, and then there is:

$$L_{2020idx_{709idx}}(x,y) = \begin{vmatrix} 1.6605 & -0.5876 & -0.0728 \\ -0.1246 & 1.1329 & -0.0083 \\ -0.0182 & -0.1006 & 1.1187 \end{vmatrix} \times L_{2020idx_{2020idx}}(x,y).$$

Therefore, by substituting the optical signals in the third optical signal set into the above-described equation, the corresponding optical signals under the first color display standard may be acquired, and then the fourth optical signal set may be further acquired.

S307: transferring the optical signals in the fourth optical signal set into the colors in the first color space, based on the opto-electrical transfer function of the first color display standard, to acquire the fourth color set.

Following the above example, if the first color display standard is the HLG color display standard, then an opto-electrical transfer function of the first color display standard is:

$$V = \begin{cases} \sqrt{3} * L_c^{0.5} & \frac{1}{12} \geq L_c \geq 0 \\ a * \ln(12 L_c - b) + c & 1 \geq L_c > \frac{1}{12} \end{cases}$$

Therefore, a red component $LR_{2020idx\_2020color}(x,y)$, a green component $LG_{2020idx\_2020color}(x,y)$ and a blue component $LB_{2020idx\_2020color}(x,y)$ of the optical signals $L_{2020idx\_2020color}(x,y)$ in the fourth optical signal set are taken as $L_c$ for substitution into the above-described opto-electrical transfer function, to obtain a red component $C_{2020idx\_2020color}(x,y)$, a green component $C_{2020idx\_2020color}(x,y)$, and a blue component $C_{2020idx\_2020color}(x,y)$ of the colors $C_{2020idx\_2020color}(x,y)$ in the fourth color set, and further acquire the fourth color set.

So far, through the above-described step S305 to step S307, the embodiment of the present disclosure implements transferring the colors in the third color set into the colors in the first color space, to acquire the fourth color set. Through the above-described step S301 to step S307, the embodiment of the present disclosure implements acquiring mapped colors in the first color space corresponding to the colors in the first color set.

S308: generating a color mapping card under the first color display standard, according to the colors in the fourth color set and a corresponding relationship between the colors in the fourth color set and the colors in the first color set.

As an optional implementation of the present disclosure, implementation of the above-described step S308 (generating a color mapping card under the first color display standard, according to the colors in the fourth color set and a corresponding relationship between the colors in the fourth color set and the colors in the first color set) may include step I to step V as follows:

Step I: generating a standard color card of the first color space.

That is, a color card that may map the colors in the first color space through coordinate values is generated.

Exemplarily, implementation of step I (generating a standard color card of the first color space) will be illustrated by taking the first color display standard as the HLG color display standard.

Exemplarily, the implementation of step I (generating a standard color card of the first color space) will be illustrated by taking the first color display standard as the HLG color display standard.

Since the color space of the HLG color display standard is bt.2020, any color in the color space bt.2020 includes: a red component, a green component, and a blue component. Therefore, the total number of colors in the first color space is: $T_R*T_G*T_B$, where, $T_R$, $T_G$, $T_B$ are respectively the total number of red components, the total number of green components, and the total number of blue components; the standard color card of the first color space may include $T_R*T_G*T_B$ color blocks, each color block has a unique coordinate value on the standard color card, and a coordinate value of each color block may uniquely map a color in the first color space. In addition, when the standard color card of the first color space includes $T_R*T_G*T_B$ color blocks, an arrangement mode of the $T_R*T_G*T_B$ color blocks in the standard color card of the first color space may be: placing color blocks whose blue components are the same into a color block group, so that a total of $T_B$ color block groups may be obtained, and each color block group includes $T_R*T_G$ color blocks; making the blue components of the $T_B$ color block groups increase one by one from 0 to $T_B-1$ from left to right and from top to bottom, so as to form a square matrix of $\sqrt{T_B}*\sqrt{V_B}$ composed of color block groups; placing, in the color block groups, color blocks whose red components are the same in a same row, and color blocks whose green components are the same in a same column, making the red components increase one by one from 0 to $T_R-1$ from left to right, and making the green components increase one by one from 0 to $T_G$-1 from left to right, so as to form a color card with a row count of $T_R*\sqrt{T_B}$, and a column count of $T_G*\sqrt{V_B}$.

Further, in order to reduce computational complexity of the color mapping card generating method, the red components, the green components, and the blue components of the first color space may be sampled with a preset values as a sampling step, and only color blocks corresponding to sampled values of the red components, the green components, and the blue components may be generated, so as to obtain a standard color card including $SP_R*SP_G*SP_B$ color blocks, where, $SP_R$, $SP_G$, $SP_B$ are respectively the number of sampled values of the red components, the number of sampled values of the green components, and the number of sampled values of the blue components. For example: $T_R$, $T_G$, $T_B$ are each 256, then the red components, the green components, and the blue components may be sampled with a sampling step of 4, to obtain sampled values of the red components $SP_R$=64, respectively: R=0, R=1/63*255, R=2/63*255, R=3/63*255, . . . , R=62/63*255, R=1, sampled values of the green components $SP_G$=64, respectively: G=0, G=1/63*255, G=2/63*255, G=3/63*255, . . . , G=62/63*255, G=1, sampled values of the blue components $SP_B$=64, respectively: B=0, B=1/63*255, B=2/63*255, B=3/63*255, . . . . B=62/63*255, B=1, so as to obtain a standard color card including 64*64*64 color blocks. In addition, when the standard color card of the first color space includes $SP_R*SP_G*SP_B$ color blocks, an arrangement mode of the $SP_R*SP_G*SP_B$ color blocks in the standard color card is: placing color blocks whose blue components are the same into a color block group, so that a total of $SP_B$ color block groups may be obtained, and each color block group includes $SP_R*SP_G$ color blocks; making the blue components of the $SP_B$ color block groups increase one by one from a minimum sampled value to a maximum sampled value from left to right and from top to bottom, so as to form a square matrix of $\sqrt{SP_B}*\sqrt{SP_B}$ composed of color block groups; arranging, in the color block groups, color blocks whose red components are the same in a same row, and color blocks whose green components are the same green component in a same column, making the red components increase one by one from a minimum sampled value to a maximum sampled value from left to right, and making the green components increase one by one from a minimum sampled value to a maximum sampled value from left to right, so as to form a standard color card with a row count of $SP_R*\sqrt{SP_B}$, and a column count of $SP_G*\sqrt{SP_B}$.

Further, before the above-described step I (generating a standard color card of the first color space), the color mapping card generating method provided by the embodiment of the present disclosure further includes:

Normalizing the color components of the colors in the first color set.

That is, the minimum color value in the first color space_is defined as $$C_{min} = \begin{bmatrix} R \\ G \\ B \end{bmatrix} = \begin{bmatrix} 0 \\ 0 \\ 0 \end{bmatrix},$$

the maximum color value in the first color space_is defined as $$C_{max} = \begin{bmatrix} R \\ G \\ B \end{bmatrix} = \begin{bmatrix} 1 \\ 1 \\ 1 \end{bmatrix},$$

and other colors are located in a floating-point form between the minimum color value $C_{min}$ and the maximum color value $C_{max}$.

Specifically, a color in the first color space may be represented as colors with different accuracies by using a variety of color ranges. For example, a color component may be represented by 8 bits, so that the first color space includes 256*256*256 colors; or a color component may be represented by 10 bits, so that the first color space includes 1024*1024*1024 colors. In the above-described embodiment, before generating the standard color card of the first color space, the color components of the colors in the first color set are normalized, so that accuracy of colors may be simplified, to further reduce computational complexity.

Step II: establishing a mapping relationship between the colors in the first color set and the coordinate values in the standard color card.

For example, when the first color display standard is the HLG color display standard, the standard color card includes 512*512 color blocks; the color blocks whose blue components are the same in the standard color card compose a color block group; the blue components of the color block group increase one by one from 0 to 1 from left to right and from top to bottom; in the color block groups, the color blocks whose red components are the same are located in a same row, the color blocks whose green components are the same are located in a same row; when the red components increase one by one from 0 to 1 from left to right, and the green components increase one by one from 0 to 1 from left to right, a mapping relationship between the colors in the first color display standard and the coordinate values in the standard color card is as follows:

$$C_{(x,y)} = \begin{bmatrix} R_{(x,y)} \\ G_{(x,y)} \\ B_{(x,y)} \end{bmatrix} = \begin{bmatrix} \frac{x \bmod 64}{63} \times R_{max} \\ \frac{x \bmod 64}{63} \times G_{max} \\ \frac{\lfloor \frac{y}{64} \rfloor \times 8 + \lfloor \frac{x}{64} \rfloor}{63} \times B_{max} \end{bmatrix}$$

Where, x is a horizontal coordinate value in the standard color card, y is a vertical coordinate value in the standard color card, mod is a remainder function, $\lfloor n \rfloor$ is a downward rounding function, and $R_{max}$, $G_{max}$, $B_{max}$ are respectively maximum values of the red components, the green components, and the blue components in the HLG color display standard.

Step III: acquiring the coordinate values corresponding to the colors in the fourth color set, according to the mapping relationship between the colors in the first color set and the coordinate values in the standard color card, as well as the corresponding relationship between the colors in the fourth color set and the colors in the first color set.

For example, the corresponding relationship between the colors in the first color set and the coordinate values in the standard color card includes: the coordinate values $(x_1, y_1)$ in the standard color card corresponding to the colors $C_{2020idx\_2020idx}(x_1, y_1)$ in the first color space; the corresponding relationship between the colors in the fourth color set and the colors in the first color set includes: the colors $C_{2020idx\_2020idx}(x_1,y_1)$ in the first color space corresponding to the colors $C_{2020idx\_2020color}(x_1,y_1)$ in the fourth color set; then the coordinate values corresponding to the colors $C_{2020idx\_2020color}(x_1,y_1)$ in the fourth color set_are $(x_1,y_1)$.

Step V: generating a color mapping card under the first color display standard, according to the colors in the fourth color set and the coordinate values corresponding to the colors in the fourth color set.

Specifically, the color blocks of the colors in the fourth color set may be set in positions of the coordinate values corresponding to the colors in the fourth color set, so as to generate the color mapping card under the first color display standard.

The color mapping card generating method provided by the embodiments of the present disclosure includes: transferring the colors in the first color set composed of the colors in the first color space of the first color display standard into the colors in the second color space, to acquire the second color set; mapping the colors in the second color set through the original color mapping card under the second color display standard to acquire the third color set; transferring the colors in the third color set into the colors in the first color space, to acquire the fourth color set; and generating the color mapping card under the first color display standard according to the colors in the fourth color set and the corresponding relationship between the colors in the fourth color set and the colors in the first color set. In the color mapping card generating method provided by the embodiments of the present disclosure, the colors in the first color set may be firstly transferred into the colors in the second color space; then the colors in the first color space after transferring are mapped through the color mapping card under the second color display standard; then the colors obtained through mapping are transferred back into the colors of the first color display standard; and finally, the color mapping card under the first color display standard is generated according to the corresponding relationship between the colors in the first color space after mapping and the colors in the first color space before mapping. Therefore, the embodiments of the present disclosure provides an implementation of generating the color mapping card under the first color display standard through the color mapping card under the second color display standard, which solves the problem of how to use a color mapping card under one color display standard to generate a color mapping card under another color display standard.

Based on a same inventive concept, as an implementation of the above-described method, an embodiment of the present disclosure further provides a color mapping card generating apparatus; the apparatus embodiment corresponds to the foregoing method embodiment; for ease of reading, detailed contents of the foregoing method embodiment will not be repeated one by one in this apparatus embodiment; but it should be clear that the color mapping card generating apparatus according to this embodiment may correspondingly implement all the contents of the foregoing method embodiment.

Figure 5:
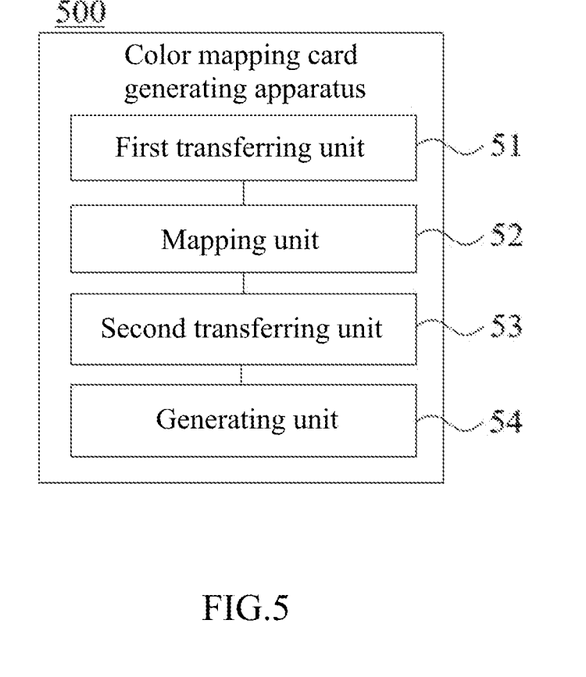
FIG. 5 is a structural schematic diagram of a color mapping card generating apparatus provided by embodiments of the present disclosure.

The embodiments of the present disclosure provide a color mapping card generating apparatus. FIG. 5 is a structural schematic diagram of the color mapping card generating apparatus. As shown in FIG. 5, the color mapping card generating apparatus 500 includes:

A first transferring unit 51, configured to transfer colors in a first color set into colors in a second color space, to acquire a second color set; wherein, the first color set includes colors in a first color space of a first color display standard;

A mapping unit 52, configured to map colors in the second color set through an original color mapping card, to acquire a third color set; wherein, the original color mapping card is a color mapping card under a second color display standard;

A second transferring unit 53, configured to transfer colors in the third color set into colors in the first color space, to acquire a fourth color set; and A generating unit 54, configured to generate a color mapping card under the first color display standard, according to colors in the fourth color set and a corresponding relationship between the colors in the fourth color set and the colors in the first color set.

As an optional implementation of the present disclosure, the generating unit 54 may be configured to generate a standard color card of the first color space; establish a mapping relationship between the colors in the first color set and coordinate values in the standard color card; acquire coordinate values corresponding to the colors in the fourth color set, according to the mapping relationship between the colors in the first color set and the coordinate values in the standard color card and the corresponding relationship between the colors in the fourth color set and the colors in the first color set; and generate a color mapping card under the first color display standard, according to the colors in the fourth color set and the coordinate values corresponding to the colors in the fourth color set.

As an optional implementation of the present disclosure, the generating unit 54 is further configured to normalize color components of the colors in the first color set, before generating the standard color card of the first color space.

As an optional implementation of the present disclosure, the first transferring unit 51 may be configured to transfer the colors in the first color set into optical signals, based on an electro-optical transfer function of the first color display standard, to acquire a first optical signal set; transfer the optical signals in the first optical signal set into optical signals under the second color display standard, to acquire a second optical signal set; and transfer optical signals in the second optical signal set into colors in the second color space, based on an opto-electrical transfer function of the second color display standard, to acquire the second color set.

As an optional implementation of the present disclosure, the original color mapping card includes a plurality of mapped color groups; first color components of the plurality of mapped color groups are respectively a plurality of sampled values of the first color components of the colors under the second color display standard; the mapping unit 52 is specifically configured to acquire a first mapped color group and a second mapped color group corresponding to the colors, according to the first color components of the colors in the second color set; a first mapped color group and a second mapped color group corresponding to any color being respectively mapped color groups whose first color components are adjacent to the first color component of the color; acquire first coordinate values and second coordinate values corresponding to the colors respectively in the first mapped color group and the second mapped color group, according to second color components and third color components of the colors in the second color set; read first mapped colors and second mapped colors of the colors from the original color mapping card, respectively according to the first coordinate values and the second coordinate values corresponding to the colors in the second color set; acquire mapped colors of the colors in the second color set, according to the first mapped colors and the second mapped colors of the colors in the second color set; and generate the third color set according to the mapped colors of the colors in the second color set.

As an optional implementation of the present disclosure, the mapping unit 52 may be configured to acquire weighting coefficients of the colors in the second color set, according to the first color components of the colors in the second color set; and weight the first mapped colors and the second mapped colors of the colors in the second color set according to the weighting coefficients, to acquire the mapped colors of the colors in the second color set.

As an optional implementation of the present disclosure, the second transferring unit 53 is specifically configured to transfer colors in the third color set into optical signals based on an electro-optical transfer function of the second color display standard, to acquire a third optical signal set; transfer optical signals in the third optical signal set into optical signals under the first color display standard, to acquire a fourth optical signal set; and transfer optical signals in the fourth optical signal set into the colors in the first color space, based on an opto-electrical transfer function of the first color display standard, to acquire the fourth color set.

As an optional implementation of the present disclosure, the first color display standard is a High Dynamic Range HDR color display standard; and the second color display standard is a Standard Dynamic Range SDR color display standard.

The color mapping card generating apparatus provided by the embodiments can execute the color mapping card generating method provided by the above-described method embodiments, and has similar implementation principles and technical effects; and no details will be repeated here.

Figure 6:
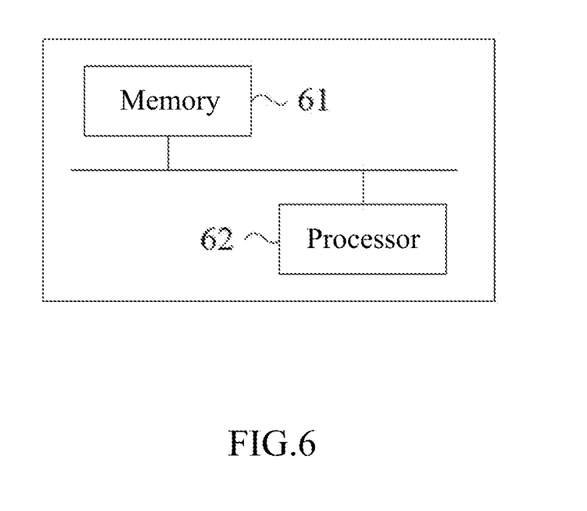
FIG. 6 is a structural schematic diagram of hardware of an electronic device provided by embodiments of the present disclosure.

Based on a same inventive concept, an embodiment of the present disclosure further provides an electronic device. FIG. 6 is a structural schematic diagram of the electronic device provided by the embodiment of the present disclosure. As shown in FIG. 6, the electronic device provided by the embodiment includes: a memory 61 and a processor 62. Wherein, the memory 61 is configured to store computer programs; the processor 62 is configured to cause, when executing the computer programs, the electronic device to implement the color mapping card generating method provided by the above-described embodiments.

An embodiment of the present disclosure further provides a computer readable storage medium; having computer programs stored thereon; wherein, the computer programs, when executed by a computing device, cause the computing device to implement the color mapping card generating method provided by the above-described embodiments.

An embodiment of the present disclosure further provides a computer program product, wherein, the computer program product, when running on a computer, causes the computer to implement the color mapping card generating method provided by the above-described embodiments.

Those skilled in the art should understand that an embodiment of the present disclosure may be provided as a method, a system, or a computer program product. Therefore, the embodiment of present disclosure may adopt a form of hardware only embodiments, software only embodiments, or embodiments with a combination of software and hardware. In addition, the embodiment of the present disclosure may adopt a form of a computer program product that is implemented on one or more computer-usable storage media that include computer-usable program codes.

The processor may be a Central Processing Unit (CPU), other general-purpose processor, a Digital Signal Processor (DSP), an Application Specific Integrated Circuit (ASIC), a Field-Programmable Gate Array (FPGA), or other programmable logic device, a discrete gate or a transistor logic device, and a discrete hardware component, etc. The general-purpose processor may be a micro-processor or any conventional processor, etc.

The memory may include a non-persistent memory, a Random Access Memory (RAM), a nonvolatile memory, and/or other form that are in a computer readable medium, for example, a Read-Only Memory (ROM) or a flash memory (flash RAM). The memory is an example of the computer readable medium.

The computer readable medium includes persistent, non-persistent, removable, and irremovable storage media that can store information by using any method or technology. The information may be a computer readable instruction, a data structure, a program module, or other data. Examples of the computer storage medium include but are not limited to a Parameter Random Access Memory (PRAM), a Static Random Access Memory (SRAM), a Dynamic Random Access Memory (DRAM), other type of Random Access Memory (RAM), a Read-Only Memory (ROM), an Electrically Erasable Programmable Read-Only Memory (EE-PROM), a flash memory or other memory technology, a Compact Disc Read-Only Memory (CD-ROM), a Digital Versatile Disc (DVD) or other optical storage, a cassette magnetic tape, a magnetic tape/magnetic disk storage, other magnetic storage device, or any other non-transmission medium, which may be configured to store information accessible by a computing device. As described in the present disclosure, the computer readable medium does not include computer-readable transitory media such as a modulated data signal and a carrier.

Finally, it should be noted that the above embodiments are only used to illustrate the technical solution of the embodiments of the present disclosure, and not to limit them. Although the disclosed embodiments have been described in detail with reference to the embodiments, ordinary technical personnel in the art should understand that they can still modify the technical solutions recorded in the embodiments, or equivalently replace some or all the technical features. And, these modifications or replacements do not make the essence of the corresponding technical solutions separate from the scope of the technical solutions of the embodiments described in the present disclosure.

The invention claimed is:

1. A color mapping card generating method, comprising:
    transferring colors in a first color set into colors in a second color space of a second color display standard, to acquire a second color set, wherein the first color set comprises colors in a first color space of a first color display standard;
    mapping colors in the second color set through an original color mapping card, to acquire a third color set, wherein the original color mapping card is a color mapping card under the second color display standard;
    transferring colors in the third color set into colors in the first color space, to acquire a fourth color set; and
    generating a color mapping card under the first color display standard, according to colors in the fourth color set and a corresponding relationship between the colors in the fourth color set and the colors in the first color set.

2. The method according to claim 1, wherein, the generating a color mapping card under the first color display standard, according to colors in the fourth color set and a corresponding relationship between the colors in the fourth color set and the colors in the first color set, comprises:

generating a standard color card of the first color space;
determining a mapping relationship between the colors in the first color set and coordinate values in the standard color card;
acquiring coordinate values corresponding to the colors in the fourth color set, according to the mapping relationship between the colors in the first color set and the coordinate values in the standard color card and the corresponding relationship between the colors in the fourth color set and the colors in the first color set; and
generating the color mapping card under the first color display standard, according to the colors in the fourth color set and the coordinate values corresponding to the colors in the fourth color set.

3. The method according to claim 2, wherein, before the generating a standard color card of the first color space, the method further comprises:
normalizing color components of the colors in the first color set.

4. The method according to claim 1, wherein, the transferring the colors in the first color set to colors in the second color space, to acquire the second color set, comprises:
transferring the colors in the first color set into optical signals, based on an electro-optical transfer function of the first color display standard, to acquire a first optical signal set;
transferring the optical signals in the first optical signal set into optical signals under the second color display standard, to acquire a second optical signal set; and
transferring optical signals in the second optical signal set into colors in the second color space, based on an opto-electrical transfer function of the second color display standard, to acquire the second color set.

5. The method according to claim 1, wherein, the original color mapping card comprises a plurality of mapped color groups; first color components of the plurality of mapped color groups are respectively a plurality of sampled values of the first color components of the colors under the second color display standard;
the mapping colors in the second color set through an original color mapping card, to acquire a third color set, comprises:
acquiring a first mapped color group and a second mapped color group corresponding to the colors, according to the first color components of the colors in the second color set; a first mapped color group and a second mapped color group corresponding to any color being respectively mapped color groups whose first color components are adjacent to the first color component of the color;
acquiring first coordinate values and second coordinate values corresponding to the colors respectively in the first mapped color group and the second mapped color group, according to second color components and third color components of the colors in the second color set;
reading first mapped colors and second mapped colors of the colors from the original color mapping card, respectively according to the first coordinate values and the second coordinate values corresponding to the colors in the second color set;
acquiring mapped colors of the colors in the second color set, according to the first mapped colors and the second mapped colors of the colors in the second color set; and
generating the third color set according to the mapped colors of the colors in the second color set.

6. The method according to claim 5, wherein, the acquiring mapped colors of the colors in the second color set, according to the first mapped colors and the second mapped colors of the colors in the second color set, comprises:
acquiring weighting coefficients of the colors in the second color set, according to the first color components of the colors in the second color set; and
weighting the first mapped colors and the second mapped colors of the colors in the second color set according to the weighting coefficients, to acquire the mapped colors of the colors in the second color set.

7. The method according to claim 1, wherein, the transferring colors in the third color set into colors in the first color space, to acquire a fourth color set, comprises:
transferring the colors in the third color set into optical signals based on an electro-optical transfer function of the second color display standard, to acquire a third optical signal set;
transferring optical signals in the third optical signal set into optical signals under the first color display standard, to acquire a fourth optical signal set; and
transferring optical signals in the fourth optical signal set into the colors in the first color space, based on an opto-electrical transfer function of the first color display standard, to acquire the fourth color set.

8. The method according to claim 1, wherein,
the first color display standard is a High Dynamic Range (HDR) color display standard; and
the second color display standard is a Standard Dynamic Range (SDR) color display standard.

9. A computer program product, wherein, the computer program product, when running on a computer, causes the computer to implement the color mapping card generating method according to claim 1.

10. A color mapping card generating apparatus, comprising:
a first transferring unit, configured to transfer colors in a first color set into colors in a second color space, to acquire a second color set; wherein, the first color set comprises colors in a first color space of a first color display standard;
a mapping unit, configured to map colors in the second color set through an original color mapping card, to acquire a third color set; wherein, the original color mapping card is a color mapping card under a second color display standard;
a second transferring unit, configured to transfer colors in the third color set into colors in the first color space, to acquire a fourth color set; and
a generating unit, configured to generate a color mapping card under the first color display standard, according to colors in the fourth color set and a corresponding relationship between the colors in the fourth color set and the colors in the first color set.

11. The apparatus according to claim 10, wherein, the generating a color mapping card under the first color display standard, according to colors in the fourth color set and a corresponding relationship between the colors in the fourth color set and the colors in the first color set, comprises:
generating a standard color card of the first color space;
determining a mapping relationship between the colors in the first color set and coordinate values in the standard color card;
acquiring coordinate values corresponding to the colors in the fourth color set, according to the mapping relationship between the colors in the first color set and the coordinate values in the standard color card and the corresponding relationship between the colors in the fourth color set and the colors in the first color set; and generating the color mapping card under the first color display standard, according to the colors in the fourth color set and the coordinate values corresponding to the colors in the fourth color set.

12. The apparatus according to claim 11, wherein, before the generating a standard color card of the first color space, the apparatus further comprises:
normalizing color components of the colors in the first color set.

13. The apparatus according to claim 10, wherein, the transferring the colors in the first color set to colors in the second color space, to acquire the second color set, comprises:
transferring the colors in the first color set into optical signals, based on an electro-optical transfer function of the first color display standard, to acquire a first optical signal set;
transferring the optical signals in the first optical signal set into optical signals under the second color display standard, to acquire a second optical signal set; and
transferring optical signals in the second optical signal set into colors in the second color space, based on an opto-electrical transfer function of the second color display standard, to acquire the second color set.

14. The apparatus according to claim 10, wherein, the original color mapping card comprises a plurality of mapped color groups; first color components of the plurality of mapped color groups are respectively a plurality of sampled values of the first color components of the colors under the second color display standard;
the mapping colors in the second color set through an original color mapping card, to acquire a third color set, comprises:
acquiring a first mapped color group and a second mapped color group corresponding to the colors, according to the first color components of the colors in the second color set; a first mapped color group and a second mapped color group corresponding to any color being respectively mapped color groups whose first color components are adjacent to the first color component of the color;
acquiring first coordinate values and second coordinate values corresponding to the colors respectively in the first mapped color group and the second mapped color group, according to second color components and third color components of the colors in the second color set;
reading first mapped colors and second mapped colors of the colors from the original color mapping card, respectively according to the first coordinate values and the second coordinate values corresponding to the colors in the second color set;
acquiring mapped colors of the colors in the second color set, according to the first mapped colors and the second mapped colors of the colors in the second color set; and
generating the third color set according to the mapped colors of the colors in the second color set.

15. The apparatus according to claim 14, wherein, the acquiring mapped colors of the colors in the second color set, according to the first mapped colors and the second mapped colors of the colors in the second color set, comprises:

acquiring weighting coefficients of the colors in the second color set, according to the first color components of the colors in the second color set; and
weighting the first mapped colors and the second mapped colors of the colors in the second color set according to the weighting coefficients, to acquire the mapped colors of the colors in the second color set.

16. The apparatus according to claim 10, wherein, the transferring colors in the third color set into colors in the first color space, to acquire a fourth color set, comprises:
transferring the colors in the third color set into optical signals based on an electro-optical transfer function of the second color display standard, to acquire a third optical signal set;
transferring optical signals in the third optical signal set into optical signals under the first color display standard, to acquire a fourth optical signal set; and
transferring optical signals in the fourth optical signal set into the colors in the first color space, based on an opto-electrical transfer function of the first color display standard, to acquire the fourth color set.

17. The apparatus according to claim 10, wherein,
the first color display standard is a High Dynamic Range (HDR) color display standard; and
the second color display standard is a Standard Dynamic Range (SDR) color display standard.

18. An electronic device, comprising a memory and a processor, wherein, the memory is configured to store computer programs; the processor is configured to cause, when executing the computer programs, the electronic device to implement:
transfer colors in a first color set into colors in a second color space of a second color display standard, to acquire a second color set, wherein the first color set comprises colors in a first color space of a first color display standard;
map colors in the second color set through an original color mapping card, to acquire a third color set, wherein the original color mapping card is a color mapping card under the second color display standard;
transfer colors in the third color set into colors in the first color space, to acquire a fourth color set; and
generate a color mapping card under the first color display standard, according to colors in the fourth color set and a corresponding relationship between the colors in the fourth color set and the colors in the first color set.

19. A non-transitory computer readable storage medium, having computer programs stored thereon; wherein, the computer programs, when executed by a computing device, cause the computing device to implement the color mapping card generating method according to claim 1.

20. The non-transitory computer readable storage medium of claim 19, wherein,
the first color display standard is a High Dynamic Range (HDR) color display standard; and
the second color display standard is a Standard Dynamic Range (SDR) color display standard.

* * * * *